F. R. MORRIS.
GRAIN DRIER AND COOLER.
APPLICATION FILED NOV. 19, 1912.
1,157,172.
Patented Oct. 19, 1915.
3 SHEETS—SHEET 2.
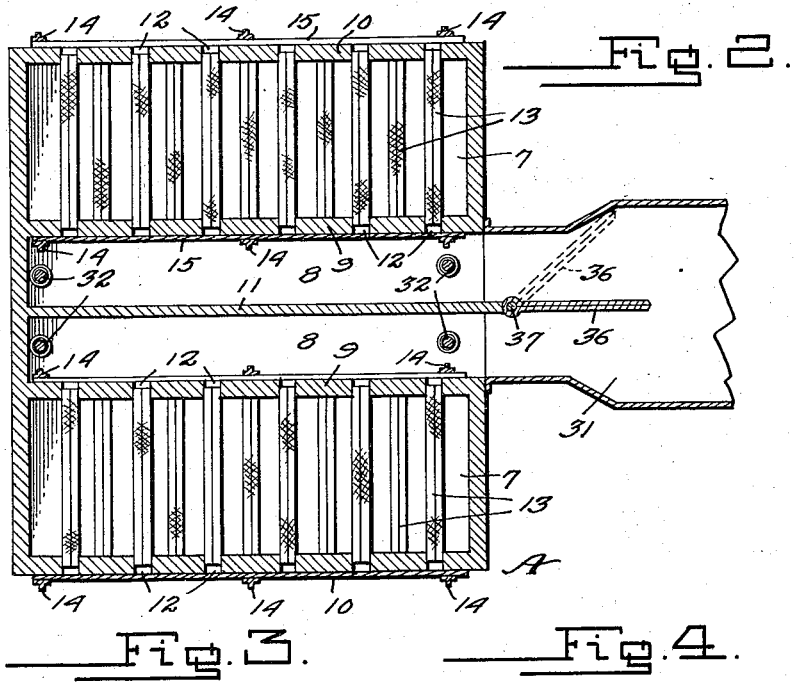
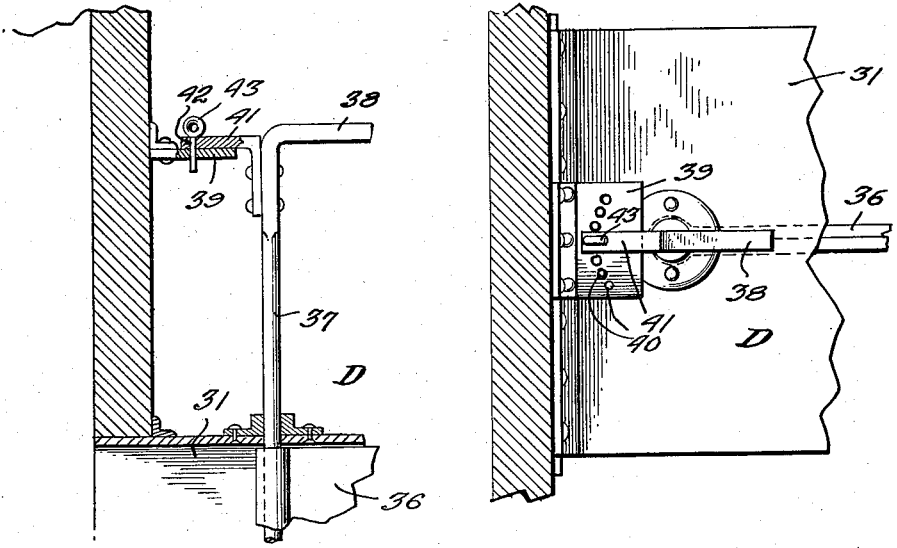
WITNESSES
INVENTOR F. R. MORRIS.
GRAIN DRIER AND COOLER.
APPLICATION FILED NOV. 19, 1912.
1,157,172.
Patented Oct. 19, 1915.
3 SHEETS—SHEET 3.
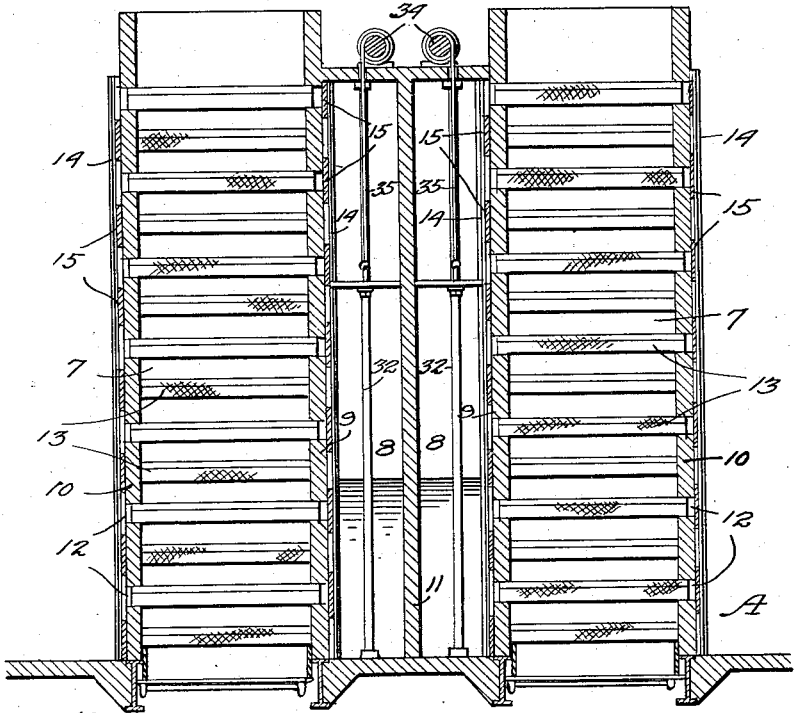
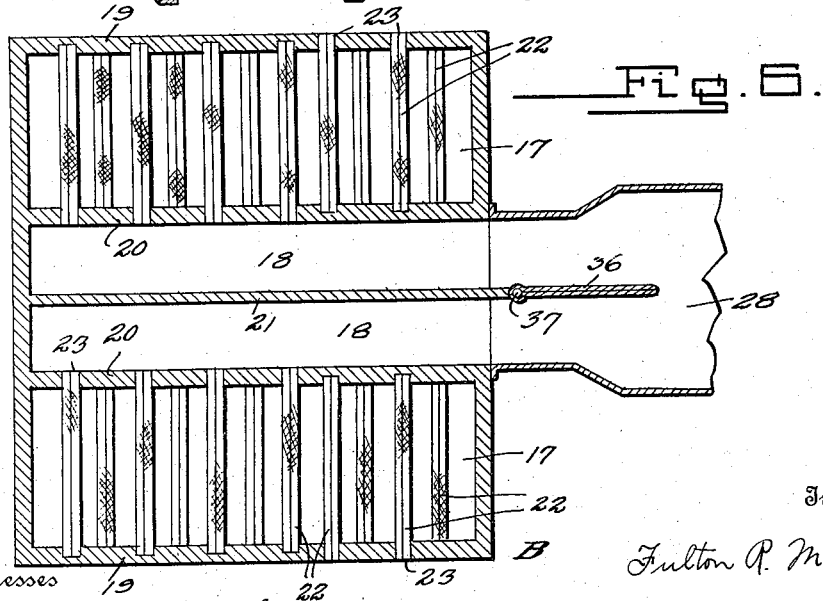

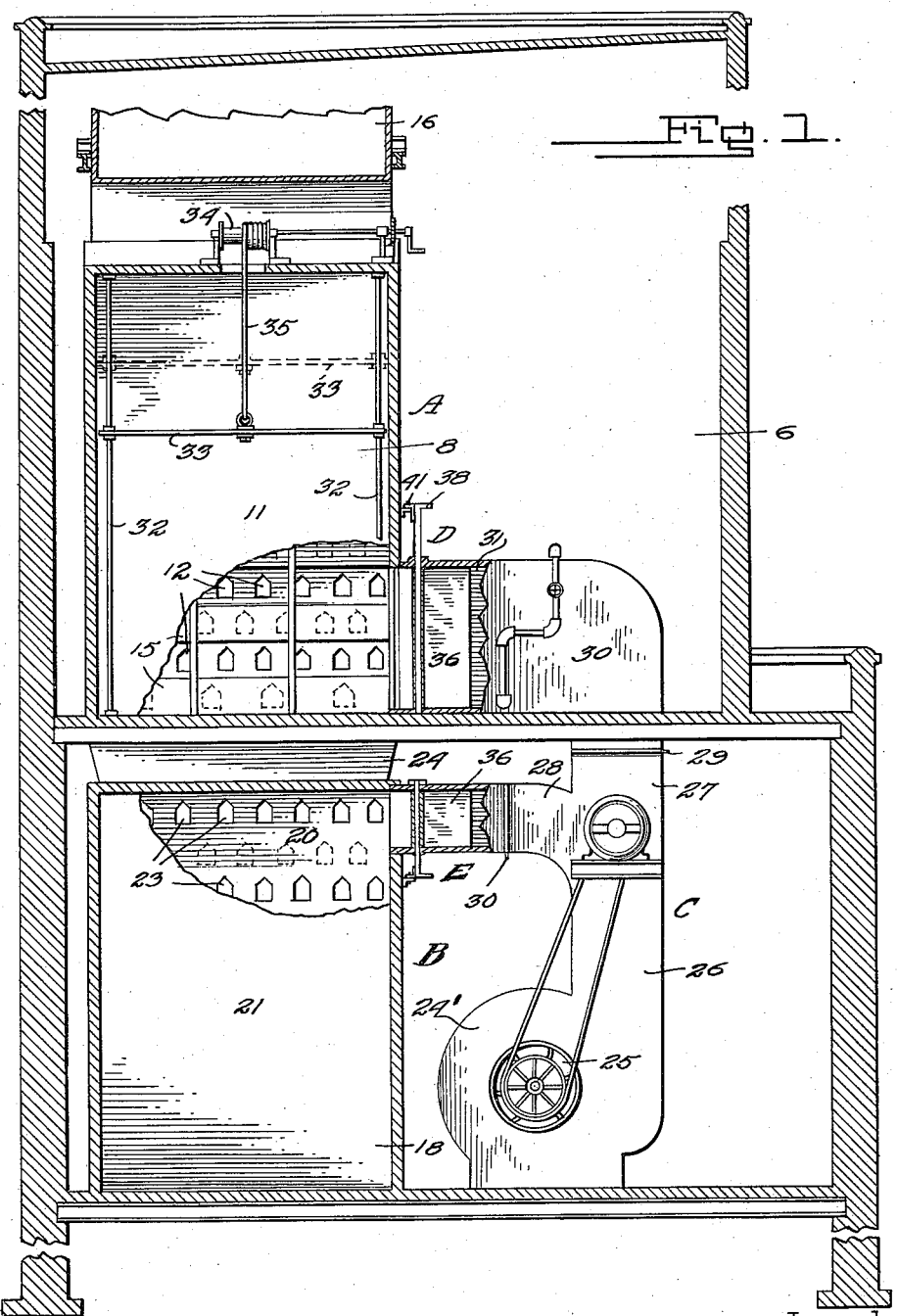

UNITED STATES PATENT OFFICE.

FULTON R. MORRIS, OF MILWAUKEE, WISCONSIN, ASSIGNOR TO MORRIS GRAIN DRIER CO., OF MILWAUKEE, WISCONSIN, A CORPORATION OF WISCONSIN.

GRAIN DRIER AND COOLER.

1,157,172.  Specification of Letters Patent.  Patented Oct. 19, 1915.

Application filed November 19, 1912. Serial No. 732,356.

*To all whom it may concern:*

Be it known that I, FULTON R. MORRIS, a citizen of the United States, residing at Milwaukee, in the county of Milwaukee and State of Wisconsin, have invented new and useful Improvements in Grain Driers and Coolers, of which the following is a specification.

This invention relates to an apparatus for drying grain, particularly in large quantities, whereby it is desired to drive off a considerable amount of moisture without disturbing the starch, oil, or other chemical properties in the grain.

The invention contemplates the drying and subsequent cooling of the grain by means of air currents properly directed or forced through the entire body of grain, by means of ducts pervious to fluid.

It has already been proposed to accomplish this by fan means adapted to draw air through the chamber for the grain being cooled, thus partially heating the air, subsequently heating the same to a higher temperature, and forcing such heated air through the chamber for the grain to be dried. This procedure has several faults, among which the most important is, in that the air leaving the cooler is sometimes damaged by passing through musty or sour grain, and hence, to subsequently pass this air through the drier, taints the grain with a musty smell, even though the grain in the drier container be sound and sweet.

The principal objects of this invention are to provide an apparatus which is simple in construction and easy to operate; one which will provide for even drying of the grain; and, one which will not disintegrate the grain, but will enable the drying to be accomplished, retaining the bright natural appearance thereof.

Further objects of the invention are to provide means whereby the apparatus may be adapted to successfully and economically dry and cool a bulk of grain considerably less than the capacity of the apparatus, and to provide means whereby the identity of any particular lot of grain may be preserved, such as when a single car load thereof is to be acted upon.

Further objects of the invention will appear in the following detailed description, taken in connection with the accompanying drawings forming a part of this specification, and in which drawing:

Figure 1 is a view in elevation and partly in vertical section through an apparatus embodying the invention, parts being broken away to disclose details. Fig. 2 is a cross sectional view through the drier, proper, of the apparatus as disclosed in Fig. 1. Fig. 3 is a detailed view partly in elevation and partly in vertical section disclosing means for controlling a valve. Fig. 4 is a plan view of the mechanism disclosed in Fig. 3. Fig. 5 is a transverse vertical sectional view through the drier proper, of the apparatus. Fig. 6 is a view similar to Fig. 2 through the cooler of the apparatus.

Similar characters refer to similar parts throughout the several views.

As disclosed in the drawings, a suitable housing 6 contains the apparatus embodying the invention, such housing being of any suitable construction according to the capacity of the apparatus, but in the example shown is constructed of steel and concrete, and more particularly to protect the apparatus from the inclemency of the weather and to exclude dust or other foreign matter from entering the several chambers.

The drier proper, designated by A is preferably constructed to provide two container chambers 7, spaced apart from each other, and two air distributing chambers 8 intermediate said chambers 7, the container chambers being each formed by the provision of two oppositely disposed walls 9 and 10. Each wall 9 is common to the container chamber 7 and its respective distributing chamber 8, the two distributing chambers being formed by a partition 11 suitably placed intermediate walls 9.

The walls 9 and 10 have a plurality of apertures 12 therein, and from the apertures in the one wall of each chamber, to those in the other wall thereof, ducts 13 are provided. These ducts are pervious to fluid, but prevent the grain, which drops by gravity into the chambers 7, from finding egress through openings 12. For the preferred means of constructing ducts 13, reference may be had to Letters Patent No. 1,028,899, granted on an application filed by me, although this construction may be varied, without departing from the spirit or scope of the invention.

Exteriorly of walls 9 and 10, are provided suitable guides 14, to receive shutters 15. These shutters are designed so as to close the one end of each duct 13 during operation of the apparatus, but as to which end is closed, this may be varied at the will of the operator. For instance, as disclosed in Fig. 1 of the drawing, the lower tier of ducts 13 are closed to the ingress of air from chamber 8, at wall 9, while the egress ends at the wall 10 are open, and in connection with the superjacent tiers, the converse is true. However, by raising the shutter 15 of the lower tier, and lowering the shutter of the superjacent tier, the former has ingress from the chamber 8 and the latter ingress from within the chamber 7. Any suitable means may be utilized for actuating the shutters 15, but the preferred form is disclosed in the copending application for Letters Patent, filed November 19th, 1912, and bearing the Serial Number 732,357.

Grain is fed to the drier A, by gravity, such as from a garner 16, which, in the example shown, delivers to both chambers 7, but may be adapted to feed to only one, when a small quantity of grain is to be acted upon. The grain may be retained within the chamber or chambers 7, so that the air is forced through the entire body of grain, or the grain may fall through the chamber so that the air filters through the grain, removing nothing therefrom but the excess moisture. As to which procedure is preferred, this depends upon the amount of moisture the grain contains.

The cooler, designated generally by B is disposed subjacent to the drier A, and is preferably constructed to provide two container chambers 17, corresponding to the chambers 7 and two air distributing chambers 18, corresponding to the chambers 8. The chambers 17 have oppositely disposed walls 19 and 20, and chambers 18 move a common partition 21. In the chambers 17 are provided ducts 22, which may be similar to ducts 13. However, it is not necessary to alternate the air currents through these ducts, hence the said ducts have one end open at either aperture 23 in wall 20, or similar apertures in wall 19, the other ends being closed. Each chamber 13, through conveyer 24, is adapted to feed to its respective chamber 17 of the cooler, so that the grain acted upon in the drier may fall, by gravity, to the cooler.

Referring now to unitary means for forcing the air through the drier and cooler chambers, which means is designated generally by C, a suitable fan blower 24', of any suitable type, such as that having its intake at 25, is provided. The main duct 26 leads from the egress of the blower, said duct branching into ducts or ways 27 and 28, which are controlled by valves 29 and 30, respectively, and preferably of the reciprocable type. The duct 29 leads to a heater 30, of any suitable type, so that the air conveyed through duct 27 is heated prior to its entering a way 31. This way 31 is in communication with the chamber or chambers 8 of the drier A, as will be hereinafter set forth. The duct or way 28 delivers air conducted therein, to the chamber or chambers 18 of the cooler B and this air is forced through the cooler, and not drawn therethrough, as was contemplated in apparatus heretofore disclosed to the public.

The apparatus as disclosed is particularly adapted for acting upon a large quantity of grain. However, it is very often desirable to dry a quantity of grain, such as a car load, and preserve the identity thereof. With this end in view, in either or both of the chambers 8, are provided upright guides 32 for a reciprocable damper 33 adapted to be raised or lowered in any suitable manner, such as through the instrumentality of a drum 34 revolubly mounted upon the drier, and a flexible member 35 which is adapted to be wound upon said drum. It is to be noted that by lowering this damper the tiers of ducts above the opening of way 31, may be cut out of communication therewith, so as to adapt the device for successfully and economically drying a small quantity of grain.

While I have herein disclosed a grain drying apparatus embodying two drying chambers, and two cooling chambers, it is obvious that the invention hereinbefore specifically described, is applicable to a grain drying apparatus having one drying chamber 7 and one cooling chamber 13, the air distributing chambers being then disposed as are chambers 8 and 18, respectively. In this instance, the ducts or ways 28 and 31 lead to each air distributing chamber in substantially the same manner as hereinbefore described. Furthermore, the damper 33 may be operated in conjunction with such single chamber and drier, to a great advantage, to alter the drying capacity thereof.

In the example shown, I have provided valve means, designated generally by D, in the way 31, whereby the air may be delivered to both chambers 8 of the drier A, or to either one thereof; and valve means E, in way 28 whereby air may be delivered to both chambers 18 of the cooler B, or to either one of said chambers. In operation, these means D and E may be identical, and comprise an oscillatable valve 36, having its axis of oscillation disposed in the plane of the partitions of the respective chamber it is to control and adjacent this partition, this valve being adapted to engage either of the opposite walls of the way in which it is disposed, to direct the air to either chamber, or when not engaging such walls thereof, to permit of its passage to both chambers.

With particular reference to Figs. 3 and 4 of the drawing, the preferred means of mounting and controlling valve 36 is disclosed, and comprising a shaft 37 to which the valve is secured, said shaft terminating in a handle 38; a plate 39 having a plurality of apertures disposed in a line concentric to the axis of oscillation of said shaft 37, said plate being rigidly mounted; an arm 41 carried laterally of shaft 37 and apertured as at 42, to be alined with any of the apertures 40 in plate 39; and, a pin 43 to retain the arm 41 rigid with plate 39, by passing through apertures 40 and 42. Thus, the valve 36 may be rigidly positioned, as desired, and purpose set forth.

The operation of the apparatus is as follows: Assuming that the grain to be acted upon has been conveyed to garner 16, and that the apparatus is to be worked to its full capacity, the dampers 33 are raised so that all of the ducts 13, not controlled by shutters 15, are open to the air distributing chambers 8. The valve 36 in way 31 is rigidly positioned as disclosed in Fig. 2, so that air may be delivered to both distributing chambers. Likewise, the valve 36 in way 28 is disposed, as disclosed in Fig. 6 of the drawing, so that air may be delivered to both chambers 18. Assuming further, that the grain contains a considerable amount of moisture, it is then desirable to retain such grain within the drier B, and not merely let fall by gravity therethrough; the desired amount of grain is permitted to drop from the garner to the chambers 7 and the blower 24' is put into operation. The air passing through duct 27 is heated prior to entering the distributing chambers 8, by its passage through heater 30 and it is to be noted that such heated air does not find egress from the chambers 7 through the same ducts it enters such chambers, but filters through the body of grain, separated only by the said ducts, which are pervious. By this action, nothing is removed from the grain but the excess moisture. After the desired amount of moisture is removed, the grain is dropped into the cooler chambers 17, directly underneath, and the same blower that delivers air to the drier chambers, forces the cold air through the cooler. At the same time, the drying of the second batch of grain is taking place, giving ample time to cool the grain, before it is necessary to remove same for the dried grain to follow.

If the grain to be acted upon does not contain a considerable amount of moisture, it may be run through the drier and cooler chambers, in a continuous flow, by first filling the drier chambers, which, after having been acted upon, is dropped into the coolers. The drier chambers are then again filled holding it in place until dried, whereupon it is permitted to descend to the coolers, by gaging the flow from the bottom of the cooler chambers, in such quantity as will properly dry and cool the grain while passing from the garner through both the driers and cooler chambers, in a continuous flow. To adapt the apparatus for use in drying a small quantity of grain has been hereinbefore described. However, it is to be noted that a very small quantity of grain may be acted upon by lowering one of the dampers 33 in chamber 8, so as to be directly above the opening of way 31 to such chamber, and that by shifting valve 36 so that air will be delivered to only the said chamber 8, the identity of a small quantity of grain may be preserved. Likewise, the cooler B may be arranged so that only one of its chambers 17, that below the active chamber 7 of drier B, has air delivered therethrough.

Changes in details may be made without departing from the spirit or scope of the invention; but,

I claim:—

1. A grain drier and cooling apparatus comprising in combination, a drier chamber, a cooler chamber to which said drier chamber delivers the material acted upon, unitary means for forcing the air through both said drier and cooler chambers separately, and means for heating the air delivered to said drier chamber prior to its entering the same, substantially as and for the purpose set forth.

2. A grain drier and cooling apparatus comprising in combination, a drier chamber, a cooler chamber to which said drier chamber delivers the material acted upon, unitary means for forcing the air through both said drier and cooler chambers separately, and means for heating the air delivered to said drier chamber prior to its entering the same, and after leaving said last-mentioned means, substantially as and for the purpose set forth.

3. A grain drier and cooling apparatus comprising in combination, a drier chamber, a cooler chamber to which said drier chamber delivers the material acted upon, a blower, a way from the egress of said blower to conduct air to be forced through said cooler chamber, a second way from the egress of said blower to conduct air to be forced through said drier chamber, and means for heating the air passing through said second way, substantially as and for the purpose set forth.

4. A grain drier and cooling apparatus comprising in combination, a drier chamber, a cooler chamber to which said drier chamber delivers the material acted upon, a blower, a way from the egress of said blower to conduct air to be forced through said cooler chamber, a valve in said way, a second way from the egress of said blower to conduct air to be forced through said drier chamber, a valve in said second way, and means for heating the air passing through said second way, substantially as and for the purpose set forth.

5. A grain drier and cooling apparatus comprising in combination, a drier chamber, a cooler chamber to which said drier chamber delivers the material acted upon, a blower, a main duct for the egress of said blower, a branch way from said duct to conduct air to be forced through said cooler chamber, a second branch way from said duct to conduct air to be forced through said drier chamber, and means for heating the air passing through said second branch way, substantially as and for the purpose set forth.

6. A grain drier and cooling apparatus comprising in combination, a drier chamber, a cooler chamber to which said drier chamber delivers the material acted upon, a blower, a main duct for the egress of said blower, a branch way from said duct to conduct air to be forced through said cooler chamber, a valve in said branch way, a second branch way from said duct to conduct air to be forced through said drier chamber, a valve in said second branch way, and means for heating the air passing through said second branch way, substantially as and for the purpose set forth.

7. A grain drier and cooling apparatus comprising in combination, two drier chambers with an air distributing way therebetween, two cooler chambers to which said drier chambers deliver the material acted upon, said cooler chambers having an air distributing way therebetween, blower means for forcing air through said distributing ways of said drier and cooler chambers, and through the latter, means for rendering the said air distributing way of said drier chamber inactive for conducting air from said blower means to either of the said chambers, and means for rendering the said air distributing way of said cooler chambers inactive for conducting air from said blower means to either of the said chambers, substantially as and for the purpose set forth.

8. A grain drier and cooling apparatus comprising in combination, a plurality of drier chambers with an air distributing way for each chamber, a plurality of cooler chambers to which said drier chambers deliver the material acted upon, said cooler chambers each having an air distributing way, blower means for forcing air through said distributing ways of said drier and cooler chambers and through the latter, means for rendering the said air distributing way of any of said drier chambers inactive for conducting air from said blower means to its respective chamber, and means for rendering the said air distributing way of any of said cooler chambers inactive for conducting air from said blower means to its respective chamber, substantially as and for the purpose set forth.

9. A grain drier and cooling apparatus comprising in combination, two drier chambers with an air distributing way therebetween, two cooler chambers to which said drier chambers deliver the material acted upon, said cooler chambers having an air distributing way therebetween, blower means for forcing air through said distributing ways of said drier and cooler chambers, and through the latter, means for rendering the said air distributing way of said drier chamber inactive for conducting air from said blower means to either of the said chambers, means for rendering the said air distributing way of said cooler chambers inactive for conducting air from said blower means to either of the said chambers, and adjustable means in the said distributing way of said drier chambers for confining the air to a path of movement through a predetermined portion of said chambers to alter the drying capacity thereof, substantially as and for the purpose set forth.

10. A grain drier and cooling apparatus comprising in combination, two drier chambers with an air distributing way therebetween, two cooler chambers to which said drier chambers deliver the material acted upon, said cooler chambers having an air distributing way therebetween, blower means for forcing air through said distributing ways of said drier and cooler chambers, and through the latter, means for rendering the said air distributing way of said drier chamber inactive for conducting air from said blower means to either of the said chambers, means for rendering the said air distributing way of said cooler chambers inactive for conducting air from said blower means to either of the said chambers, and adjustable means in the said distributing way of said drier chambers for confining the air to a path of movement through a predetermined portion of any one of said chambers to alter the drying capacity thereof, substantially as and for the purpose set forth.

11. In a grain drier and cooling apparatus, the combination of means providing two container chambers spaced apart from each other and air distributing chambers therebetween separated by a partition, a way for conducting air to both of the said air distributing chambers simultaneously, and an oscillatable valve in said way having its axis of oscillation in the plane of said partition, disposed in close proximity thereto and adapted to engage with either of the two opposite walls of said way laterally thereof, substantially as and for the purpose set forth.

12. In a grain drier and cooling apparatus, the combination of means providing two container chambers spaced apart from each other and air distributing chambers therebetween separated by a partition, a way for conducting air to both of the said air distributing chambers simultaneously, an oscillatable valve in said way having its axis of oscillation in the plane of said partition, disposed in close proximity thereto and adapted to engage with either of the two opposite walls of said way laterally thereof, and means for retaining said valve in a rigid position within said way, substantially as and for the purpose set forth.

13. In a grain drier and cooling apparatus, the combination of means providing two container chambers spaced apart from each other and air distributing chambers therebetween separated by a partition, a way for conducting air to both of the said air distributing chambers simultaneously, an oscillatable valve in said way having its axis of oscillation in the plane of said partition, disposed in close proximity thereto and adapted to engage with either of the two opposite walls of said way laterally thereof, and means exterially of said way for retaining said valve in a rigid adjusted position therein, substantially as and for the purpose set forth.

14. In a grain drier and cooling apparatus, the combination of means providing two container chambers spaced apart from each other and air distributing chambers therebetween separated by a partition, a way for conducting air to both of the said air distributing chambers simultaneously, a shaft in said way extending exterially thereof and disposed with its axis in the plane of said partition, a valve in said way carried by said shaft in close proximity in said partition and adapted to engage with either of the two opposite walls of said way laterally thereof, an arm extending laterally of said shaft exterially of said way and having a transverse aperture, a plate rigidly mounted, having a plurality of apertures disposed in a line concentric to the axis of oscillation of said shaft and with any one of which the said aperture in said arm may be alined, and a pin adapted to pass through the said aperture in the said arm and through any one of the said apertures in said plate, substantially as and for the purpose set forth.

15. In a grain drying and cooling apparatus, the combination of a drier including two container chambers spaced apart from each other and air distributing means therebetween separated by a partition, a way for conducting air to both of said air distributing chambers simultaneously, an oscillatable valve in the said way having its axis of oscillation in the plane of said partition, disposed in close proximity thereto and adapted to engage with either of the two opposite walls of said way laterally thereof, a cooler including two container chambers spaced apart from each other, to which the said container chambers of said drier deliver material acted upon, and air distributing chambers between said cooler chambers separated by a partition, a way for conducting air to both of the said air distributing chambers of said cooler simultaneously, and an oscillatable valve in said last-mentioned way having its axis of oscillation in the plane of the said partition of said last-mentioned air distributing chambers, disposed in close proximity to such partition, and adapted to engage either of the two opposite walls of said last-mentioned way laterally thereof, substantially as and for the purpose set forth.

16. In a grain drying and cooling apparatus, the combination of a drier including two container chambers spaced apart from each other and air distributing means therebetween separated by a partition, a way for conducting air to both of said air distributing chambers simultaneously, an oscillatable valve in the said way having its axis of oscillation in the plane of said partition, disposed in close proximity thereto and adapted to engage with either of the two opposite walls of said way laterally thereof, means for retaining said valve in a rigid position within said way, a cooler including two container chambers spaced apart from each other, to which the said container chambers of said drier deliver material acted upon, and air distributing chambers between said cooler chambers separated by a partition, a way for conducting air to both of the said air distributing chambers of said cooler simultaneously, an oscillatable valve in said last-mentioned way having its axis of oscillation in the plane of the said partition of said last-mentioned air distributing chambers, disposed in close proximity to such partition, and adapted to engage either of the two opposite walls of said last-mentioned way laterally thereof, and means for retaining said last-mentioned valve in a rigid position within said last-mentioned way, substantially as and for the purpose set forth.

17. In a grain drying and cooling apparatus, the combination of a drier including two container chambers spaced apart from each other and air distributing means therebetween separated by a partition, a way for conducting air to both of said air distributing chambers simultaneously, an oscillatable valve in the said way having its axis of oscillation in the plane of said partition, disposed in close proximity thereto and adapted to engage with either of the two opposite walls of said way laterally thereof, means exterially of said way for retaining said valve in a rigid position therein, a cooler including two container chambers spaced apart from each other, to which the said container chambers of said drier deliver material acted upon, and air distributing chambers between said cooler chambers separated by a partition, a way for conducting air to both of the said air distributing chambers of said cooler simultaneously, an oscillatable valve in said last-mentioned way having its axis of oscillation in the plane of the said partition of said last-mentioned air distributing chambers, disposed in close proximity to such partition, and adapted to engage either of the two opposite walls of said last-mentioned way laterally thereof, and means exterially of said second-mentioned way for retaining said second-mentioned valve in a rigid position therein, substantially as and for the purpose set forth.

18. In a grain drier and cooling apparatus, the combination of a container chamber, an air distributing chamber about one wall thereof, said container chamber having a plurality of ducts open to said air distributing chamber through the said wall, means for delivering air to said distributing chambers adjacent the bottom thereof, and a damper in said air distributing chamber reciprocable above said air delivery means and bodily movable toward or from the latter, substantially as and for the purpose set forth.

19. In a grain drier and cooling apparatus, the combination of a container chamber, an air distributing chamber about one wall thereof, said container chamber having a plurality of ducts open to said air distributing chamber through the said wall, means for delivering air to said distributing chambers adjacent the bottom thereof, and means for altering the capacity of said air distributing chamber available for delivery of air to said ducts to various degrees, substantially as and for the purpose set forth.

20. In a grain drier and cooling apparatus, the combination of a container chamber, an air distributing chamber about one wall thereof, said container chamber having a plurality of tiers of ducts open to said air distributing chamber through the said wall, means for delivering air to said distributing chamber adjacent the bottom thereof, and means for altering the magnitude of said air distributing chamber in communication with said air delivery means, by altering the position of the wall of said chamber opposite from its air inlet, substantially as and for the purpose set forth.

FULTON R. MORRIS.

Witnesses:
 CARL B. RIX,
 LOTTIE W. CLOUGH.

Copies of this patent may be obtained for five cents each, by addressing the "Commissioner of Patents, Washington, D. C."